United States Patent
Lu et al.

(10) Patent No.: US 10,193,144 B2
(45) Date of Patent: Jan. 29, 2019

(54) HIGH CAPACITY LITHIUM ION BATTERIES HAVING OXIDES, PEROXIDES, OR SUPEROXIDES AS CATHODE ACTIVE MATERIAL

(71) Applicant: UChicago Argonne, LLC, Chicago, IL (US)

(72) Inventors: Jun Lu, Bolingbrook, IL (US); Rui Xu, Westmont, IL (US); Xiangyi Luo, Westmont, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 353 days.

(21) Appl. No.: 14/973,355

(22) Filed: Dec. 17, 2015

(65) Prior Publication Data
US 2017/0179475 A1   Jun. 22, 2017

(51) Int. Cl.
| | |
|---|---|
| *H01M 4/48* | (2010.01) |
| *H01M 4/36* | (2006.01) |
| *H01M 10/0525* | (2010.01) |
| *H01M 4/525* | (2010.01) |
| *H01M 10/052* | (2010.01) |
| *H01M 4/583* | (2010.01) |
| *H01M 4/505* | (2010.01) |

(52) U.S. Cl.
CPC ............ *H01M 4/366* (2013.01); *H01M 4/36* (2013.01); *H01M 4/483* (2013.01); *H01M 4/525* (2013.01); *H01M 10/052* (2013.01); *H01M 10/0525* (2013.01); *H01M 4/48* (2013.01); *H01M 4/505* (2013.01); *H01M 4/583* (2013.01); *H01M 2220/20* (2013.01); *H01M 2220/30* (2013.01)

(58) Field of Classification Search
CPC ...... H01M 4/36; H01M 10/0525; H01M 4/48; H01M 4/505; H01M 4/525; H01M 4/583; H01M 4/366; H01M 2220/20; H01M 2220/30
See application file for complete search history.

(56) References Cited

U.S. PATENT DOCUMENTS

| | | | |
|---|---|---|---|
| 6,991,876 B2 * | 1/2006 | Narang | H01M 4/364 429/213 |
| 8,968,941 B2 | 3/2015 | Amine et al. | |
| 2004/0091774 A1 * | 5/2004 | Narang | H01M 4/364 429/218.1 |
| 2008/0268327 A1 * | 10/2008 | Gordon | H01M 2/1646 429/50 |
| 2012/0088154 A1 | 4/2012 | Liu et al. | |
| 2013/0230783 A1 * | 9/2013 | Amine | H01M 2/162 429/405 |
| 2013/0330630 A1 * | 12/2013 | Christensen | H01M 4/485 429/231.95 |
| 2014/0255795 A1 | 9/2014 | Manthiram et al. | |
| 2014/0272610 A1 | 9/2014 | Amine et al. | |
| 2015/0010825 A1 | 1/2015 | Yang et al. | |
| 2015/0171496 A1 | 6/2015 | Amine et al. | |
| 2015/0228964 A1 | 8/2015 | Wu et al. | |

OTHER PUBLICATIONS

Hardwig et all Current Opinion in Solid State and Materials Science 16 (2012) 178-185.*
Black et al. J. Amer. Chem. Soc, 2012,134, 2902_2905.*

* cited by examiner

*Primary Examiner* — Alexander Usyatinsky
(74) *Attorney, Agent, or Firm* — Foley & Lardner LLP

(57) ABSTRACT

Described herein is an electrochemical device including a cathode containing an electroactive material including $LO_2$ or $L_2O_2$, wherein each L is independently selected from Li, Na, K, Be, Mg, Ca, and Al; the electroactive material is carbon-coated, metal-coated, metal oxide-coated, nano-sized, or doped; and the electroactive material is substantially free of transition metal catalyst.

17 Claims, 4 Drawing Sheets

HIGH CAPACITY LITHIUM ION BATTERIES HAVING OXIDES, PEROXIDES, OR SUPEROXIDES AS CATHODE ACTIVE MATERIAL

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries containing the same. More specifically, the present technology is related to oxygen-based (e.g., oxide, peroxide, and superoxide) redox couples in lithium ion batteries without requiring the presence of heavy transition metals.

SUMMARY

In one aspect, provided herein are electrochemical devices including a cathode containing an electroactive material including $LO_2$ or $L_2O_2$, wherein each L is independently selected from Li, Na, K, Be, Mg, Ca, and Al; the electroactive material is carbon-coated, metal-coated, metal oxide-coated, nano-sized, or doped; and the electroactive material is substantially free of transition metal catalyst. In some embodiments, the electrochemical device is a lithium-ion battery. In some embodiments, the lithium-ion battery further includes an anode and a separator. In some embodiments, the anode includes a current collector, a conductive carbon material, a binder, or any combination thereof. In some embodiments, the anode is a metallic lithium anode. In some embodiments, the anode is substantially free of metallic lithium.

In another aspect, provided herein are cathodes including an electroactive material containing $LO_2$ or $L_2O_2$, wherein each L is independently selected from Li, Na, K, Be, Mg, Ca, and Al; and the electroactive material is carbon-coated, metal-coated, metal oxide-coated, nano-sized, or doped. In some embodiments, the cathode further includes a current collector, a conductive carbon material, a binder, or any combination thereof. In some embodiments, the electroactive material is doped with Li, Na, K, Be, Mg, Ca, Al, Cu, Mn, Nd, Ag, Ti, Ni, Al, Cd, Ir, Ta, Y, Zr, Nb, Rh, or Cr.

In another aspect, provided herein are electroactive materials including $LO_2$ or $L_2O_2$, wherein each L is independently selected from Li, Na, K, Be, Mg, Ca, and Al; and the electroactive material is carbon-coated, metal-coated, metal oxide-coated, nano-sized, or doped. In some embodiments, L is independently Li or K. In some embodiments, L is Li. In some embodiments, L is K. In some embodiments, the electroactive material is non-cycled active material. In some embodiments, $LO_2$ or $L_2O_2$ is present in the electroactive material in an amount of from about 50 wt. % to about 100 wt. %. In some embodiments, the electroactive material is doped with a dopant selected from the group consisting of Li, Na, K, Be, Mg, Ca, Al, Cu, Mn, Nd, Ag, Ti, Ni, Al, Cd, Ir, Ta, Y, Zr, Nb, Rh, and Cr. In some embodiments, the dopant is present in the electroactive material in an amount of from about 1 wt. % to about 10 wt. %. In some embodiments, the electroactive material includes carbon-coated particles of $LO_2$ or $L_2O_2$. In some embodiments, the electroactive material includes metal-coated particles of $LO_2$ or $L_2O_2$. In some embodiments, the metal-coated particles are coated with a metal selected from the group consisting of aluminum, nickel, silver, gold, and platinum. In some embodiments, the electroactive material includes nano-sized particles of $LO_2$ or $L_2O_2$ that are from about 1 nm to about 100 nm wide.

DETAILED DESCRIPTION

Figure 1:
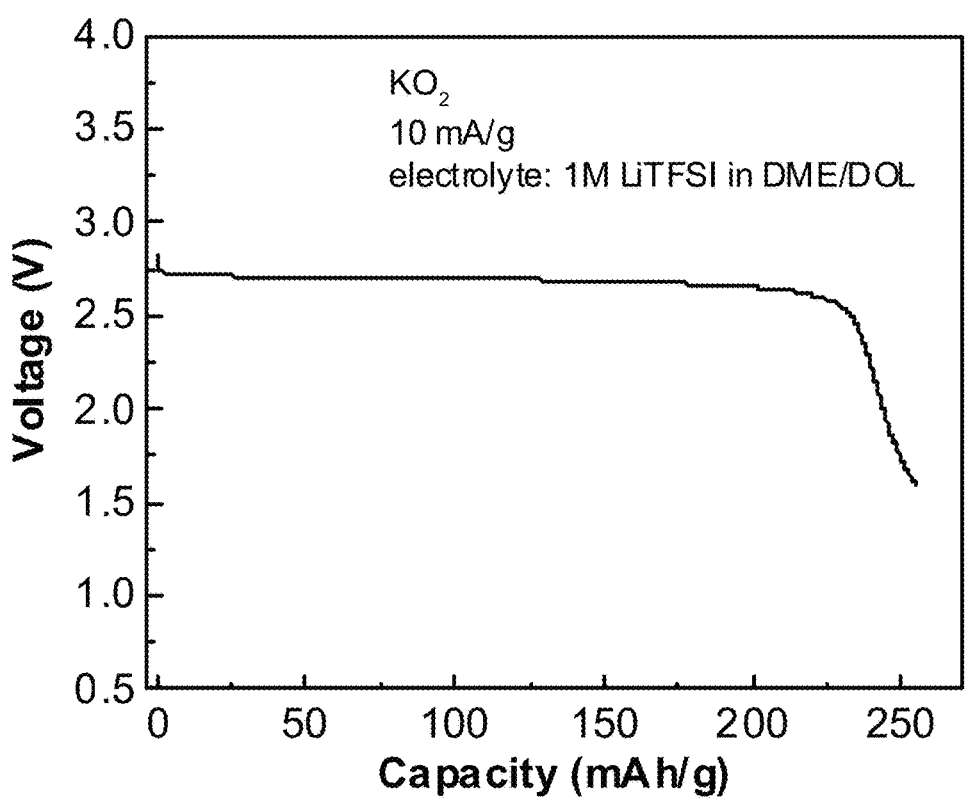
FIG. 1 depicts the discharge voltage profile of a non-limiting example of a $KO_2$ battery.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Rechargeable lithium-ion batteries, since their introduction in the 1970s and their commercialization in the 1990s, have been widely used to power portable electronic devices, such as cellular phones and laptop computers. However, state-of-the-art lithium ion battery cathode materials based on the intercalation mechanism can only reach a specific capacity up to 300 mAh/g, which is not sufficient for the long-term needs of future applications such as in electric vehicles and smart grids. For decades, researchers have sought to advance the specific capacity and specific energy of lithium ion batteries. However, the presence of heavy transitional metals (e.g., $Mn^{3+}/Mn^{4+}$, $Fe^{2+}/Fe^{3+}$) was necessary in conventional lithium ion battery cathode materials, greatly limiting the specific capacity of the cathodes based on the intercalation mechanism. In addition, previous work on oxygen-based redox couples has generally been based on lithium air batteries in which oxygen gas is involved, leading to complicated issues during battery charge and discharge, and requiring a different battery setup from commercial lithium ion batteries.

Provided herein, in one aspect, are electroactive materials including oxygen-based (e.g., oxides, peroxides and superoxides) redox couples without the requirement of the presence of transition metals. In some embodiments, the redox couples are $O^{2-}/O_2^{2-}$, $O_2^{2-}/O_2^{-}$ or $O^{2-}/O_2^{-}$.

In some embodiments, the electroactive materials disclosed herein contain no catalyst to enable the redox reaction(s). The oxygen-based redox couples generally rely on the following reactions:

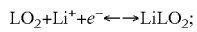

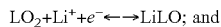

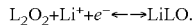

In the above reactions, L is an alkali or alkaline earth metal. According to various embodiments, the oxygen-based redox couples may include, but are not limited to:

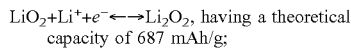

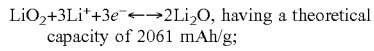

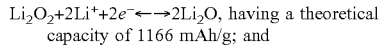

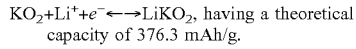

The electroactive material may include $LO_2$ or $L_2O_2$, wherein each L is independently selected from Li, Na, K, Be, Mg, Ca, and Al. In some embodiments, the electroactive material is carbon-coated, metal-coated, metal oxide-coated, nano-sized, or doped, or any combination thereof. In some embodiments, the electroactive material includes $LO_2$ or $L_2O_2$, wherein each L is independently selected from Li, Na, K, Be, Mg, Ca, and Al; and the electroactive material is substantially free of transition metal catalyst. In some embodiments, substantially free of transition metal catalyst means less than or equal to 1, 2, 3, 4, 5, 6, 7, 8, 9, or 10 wt. % of transition metal catalyst.

The electroactive material may be non-cycled active material.

$LO_2$ or $L_2O_2$ may be present in the electroactive material in an amount of from about 50 wt. % to about 100 wt. %. This includes an amount of from about 50 wt. % to about 90 wt. %; an amount of from about 50 wt. % to about 80 wt. %; an amount of from about 50 wt. % to about 70 wt. %; an amount of from about 60 wt. % to about 100 wt. %; an amount of from about 60 wt. % to about 90 wt. %; an amount of from about 60 wt. % to about 80 wt. %; an amount of from about 60 wt. % to about 70 wt. %; an amount of from about 70 wt. % to about 100 wt. %; an amount of from about 70 wt. % to about 90 wt. %; an amount of from about 70 wt. % to about 80 wt. %; an amount of from about 80 wt. % to about 100 wt. %; an amount of from about 80 wt. % to about 90 wt. %; or an amount of from about 90 wt. % to about 100 wt. %. In some embodiments, $LO_2$ or $L_2O_2$ is present in the electroactive material in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. %, including increments therein.

The electroactive material may be doped with a dopant selected from the group consisting of Li, Na, K, Be, Mg, Ca, Al, Cu, Mn, Nd, Ag, Ti, Ni, Al, Cd, Ir, Ta, Y, Zr, Nb, Rh, and Cr. The dopant may be present in the electroactive material in an amount of from about 1 wt. % to about 10 wt. %. This includes an amount of from about 1 wt. % to about 8 wt. %; about 1 wt. % to about 6 wt. %; about 1 wt. % to about 5 wt. %; about 1 wt. % to about 4 wt. %; about 1 wt. % to about 3 wt. %; about 2 wt. % to about 10 wt. %; about 2 wt. % to about 8 wt. %; about 2 wt. % to about 6 wt. %; about 2 wt. % to about 5 wt. %; about 2 wt. % to about 4 wt. %; about 3 wt. % to about 5 wt. %; about 4 wt. % to about 10 wt. %; about 4 wt. % to about 8 wt. %; about 4 wt. % to about 6 wt. %; about 5 wt. % to about 10 wt. %; about 6 wt. % to about 10 wt. %; about 6 wt. % to about 8 wt. %; or about 8 wt. % to about 10 wt. %. In some embodiments, the dopant is present in the electroactive material in an amount of about 0.5, 1, 2, 3, 4, 5, 6, 7, 8, 9, or 10 wt. %, or more.

The electroactive material may include carbon-coated particles of $LO_2$ or $L_2O_2$. The particles may be uniformly carbon-coated. The particles may be non-uniformly carbon-coated.

The electroactive material may include metal-coated particles of $LO_2$ or $L_2O_2$. The particles may be uniformly metal-coated. The particles may be non-uniformly metal-coated. The particles may be coated with a metal selected from the group consisting of aluminum, nickel, silver, gold, and platinum, and any combination thereof.

The electroactive material may include metal oxide-coated particles of $LO_2$ or $L_2O_2$. The particles may be uniformly metal oxide-coated. The particles may be non-uniformly metal oxide-coated. The particles may be coated with a metal oxide selected from the group consisting of metal hydroxides, metal oxy-hydroxides, metal oxides, metal oxyfluorides, metal phosphates, and metal sulfates, including, but not limited to $Al(OH)_3$, $Al_2O_3$, ZnO, $ZrO_2$, $MnO_2$, $CeO_2$, $Li_2MnO_3$, $TiO_2$, MgO, AlOF, $Zn_2OF_2$, $FePO_4$, $Ca_3(PO_4)_2$ $CaSO_4$, and $BaSO_4$.

The electroactive material may include nano-sized particles of $LO_2$ or $L_2O_2$. The nano-sized particles of $LO_2$ or $L_2O_2$ may be about 1 to about 100 nm wide. This includes nano-sized particles of $LO_2$ or $L_2O_2$ that are about 1 to about 75 nm wide; about 1 to about 50 nm wide; about 1 to about 25 nm wide; or about 1 to about 10 nm wide. In some embodiments, the nano-sized particles of $LO_2$ or $L_2O_2$ are about 5 to about 100 nm wide. This includes the nano-sized particles of $LO_2$ or $L_2O_2$ that are about 5 to about 75 nm wide; about 5 to about 50 nm wide; about 5 to about 25 nm wide; or about 5 to about 10 nm wide. In some embodiments, the nano-sized particles of $LO_2$ or $L_2O_2$ are about 10 to about 100 nm wide. This includes nano-sized particles of $LO_2$ or $L_2O_2$ that are about 10 to about 75 nm wide; about 10 to about 50 nm wide; or about 10 to about 25 nm wide. In some embodiments, the nano-sized particles of $LO_2$ or $L_2O_2$ are about 25 to about 100 nm wide. This includes nano-sized particles of $LO_2$ or $L_2O_2$ that are about 25 to about 75 nm wide; or about 25 to about 50 nm wide. In some embodiments, the nano-sized particles of $LO_2$ or $L_2O_2$ are about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, or 100 nm, including increments therein, wide.

In another aspect, disclosed herein are methods to prepare the electroactive materials disclosed herein.

In another aspect, disclosed herein are electrodes containing an electroactive material disclosed herein. The electroactive material may include $LO_2$ or $L_2O_2$, wherein each L is independently selected from Li, Na, K, Be, Mg, Ca, and Al; and the electroactive material is substantially free of transition metal catalyst. In some embodiments, the electroactive material is carbon-coated, metal-coated, metal oxide-coated, nano-sized, or doped. In some embodiments, the electrodes are cathodes.

In some embodiments, the cathode further includes one or more of a current collector, a conductive carbon material, and a binder.

In another aspect, disclosed herein are electrochemical devices including an electrode containing an electroactive material disclosed herein. The electrochemical device may include a cathode containing an electroactive material including $LO_2$ or $L_2O_2$, wherein each L is independently selected from Li, Na, K, Be, Mg, Ca, and Al; and the electroactive material is substantially free of transition metal catalyst. In some embodiments, the electrochemical devices are lithium-ion batteries. In some embodiments, the electrochemical devices are primary batteries, secondary batteries, or capacitors.

The secondary battery or cathode described herein may be an "as-prepared" secondary battery and cathode. As used herein, "as-prepared" refers to a cathode or battery, as prepared, prior to any charging of the battery or cathode, or discharging of the battery or cathode. The "as-prepared" does not imply any sort of time constraint, or in other words, the cathode or battery may actually have been prepared long ago, but it was not subjected to any charging or discharging process. Accordingly, the as-prepared cathode or battery has not been subjected to electrochemical processes that would generate any lithium species or other species that were included in the battery or cathode in the first instance. In some embodiments, the secondary battery is a non-discharged secondary battery. In other embodiments, the cathode is a non-discharged cathode.

In some embodiments, the amount of $LO_2$ or $L_2O_2$ present in the electroactive material after a single full cycle in the electrochemical device is no less than 70-80% of the amount of $LO_2$ or $L_2O_2$ present in the electroactive material prior to the single full cycle, regardless of the number of full cycles performed beforehand.

In some embodiments, the electrochemical device further includes an anode and a separator. In some embodiments, the electrochemical device further includes an anode, a separator, and an electrolyte.

The anode may be formed of an anode active material. In some embodiments, the anode includes an anode active material. In some embodiments, the anode further includes one or more of a current collector, a conductive carbon material, and a binder. In some embodiments, the anode includes lithium metal. In some embodiments, the anode is a metallic lithium anode. In some embodiments, the anode is substantially free of metallic lithium. In some embodiments, substantially free of metallic lithium means less than or equal to about 10%, 9%, 8%, 7%, 6%, 5%, 4% 3%, 2%, 1%, or 0.5%, or less, including increments therein, of metallic lithium. In some embodiments, the anode active material is a material that is configured to be lithiated from about 0 V to 2.0 V versus lithium, with a high capacity material such as carbonaceous materials (e.g., graphite, amorphous carbon), Si, Si—C, SiO, Sn, P, tin oxides, composite tin alloys, other metal alloys, transition metal oxides, or lithium metal nitrides.

Illustrative conductive carbon materials include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjenblack®.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto.

When used, the binder may be present in the electrode in an amount of from about 0.1 wt. % to about 99 wt. %. In some embodiments, the binder is present in the electrode in an amount of from about 5 wt. % to about 20 wt. %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative separators include, but are not limited to, polyethylene, polypropylene, and polyvinylidene fluoride (PVDF).

The electrolyte may include a solvent and a salt. Suitable solvents for use in the electrolytes are typically polar aprotic solvents. Illustrative solvents include, but are not limited to, ethylene carbonate (EC), dimethylcarbonate (DMC), diethylcarbonate (DEC), propylene carbonate (PC), dioloxane, γ-butyrolactone, δ-butyrolactone, dimethyl ether, a silane, siloxane N-methyl acetamide, acetonitrile, an acetal, a ketal, ester, a carbonate (e.g., cyclic alkyl, acyclic alkyl), a sulfone, a sulfite, sulfolane, an aliphatic ether, a cyclic ether, a glyme, a polyether, a phosphate ester, a siloxane, a N-alkylpyrrolidone, fluoro ether and fluoro ester, fluoroethylene carbonate, and adiponitrile. In some embodiments, a mixture of any two or more such solvents is used. In some embodiments, the solvent is a mixture of solvents such as, but not limited to, EC-DMC, EC-DEC, EC-PC, EC-PC-DMC, EC-PC-DEC, or EC-DEC-DMC. In some embodiments, fluorinated derivatives of the above solvents are used. Suitable salt materials include, but are not limited to, a lithium salt, a sodium salt, an ammonium salt, an alkylammonium salt, a lithium polysulfide, or a lithium polyselenide. Illustrative salts are $LiPF_6$, $LiClO_4$, $(C_4BO_8Li)$, $(C_2BO_4F_2Li)$, $LiPF_4C_2O_4$, $Li(CF_3SO_2)_2N$, $LiC(SO_2CF_3)_3$, $(Li(C_2F_5$ $SO_2)_2N)$, $LiCF_3SO_3$, $Li_2B_{12}X_{12-n}H_n$, $Li_2B_{10}X_{10-n'}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, $Na_2SO_4$, $NaPF_6$, $NaClO_4$, $LiAlO_2LiSCN$, LiBr, LiI, $LiAsF_6$, $LiB(Ph)_4$, $LiSO_3CH_3$, $(LiS_{x''}-R)_y$ or $(LiSe_{x''}-R)_y$; wherein x" is an integer from 1 to 20, y is an integer from 1 to 3 and R is H, alkyl, alkenyl, aryl, ether, F, $CF_3$, $COCF_3$, $SO_2CF_3$, and $SO_2F$. In some embodiments, one or more electrolyte additives (e.g., LiI, NaI, LiBr, NaBr) are added to an ether-based electrolyte.

The present invention, thus generally described, will be understood more readily by reference to the following examples, which are provided by way of illustration and are not intended to be limiting of the present invention.

EXAMPLES

Example 1

Figure 2:
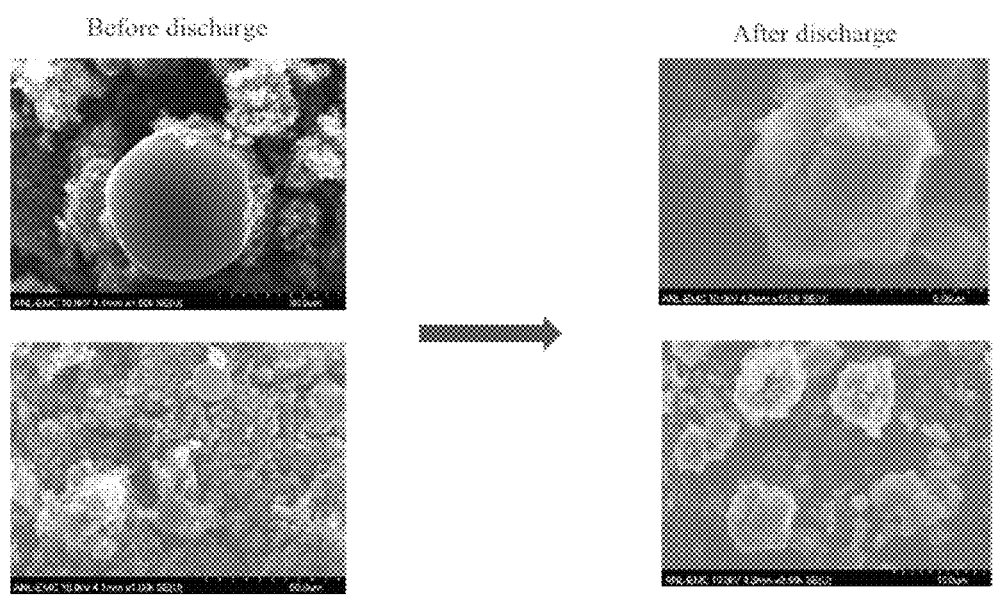
FIG. 2 depicts scanning electronic microscopy (SEM) images of the $KO_2$ electrode before and after the discharge in the non-limiting example of a $KO_2$ battery of FIG. 1.

A lithium ion coin cell was prepared using a $KO_2$ cathode. The cathode was composed of 60% $KO_2$ powder (purchased from Sigma Aldrich), 35% carbon black, and 5% PVDF 5130. The anode was lithium metal. The electrolyte was 1 M lithium bis(trifluoromethanesulfonyl)-imide (LiTFSI) in a mixture of 1,3-dioxolane (DOL) and 1,2-dimethoxyethane ether (DME) solvents (1:1 ratio by volume). The test current was 10 mA/g, and the discharge voltage window was from open circuit voltage (2.8 V) down to 1.5 V. FIG. 1 shows the discharge voltage profile of this lithium ion battery using $KO_2$ as the cathode active material. The discharge plateau was at around 2.7 V and the discharge capacity was around 250 mAh/g. FIG. 2 depicts the morphologies of the $KO_2$ electrode before and after the discharge process in the lithium ion battery, as observed by SEM. A clear change of the $KO_2$ particles was identified after the discharge. In a freshly prepared $KO_2$ electrode, $KO_2$ particles were round, showing a very smooth surface. After discharge, the particles exhibited a much rougher morphology, indicating the successful conversion reaction of the lithium ions with the cathode. The discharge voltage profile in FIG. 1, and the change of $KO_2$ particle morphology after discharge in FIG. 2, demonstrates the successful electrochemical reaction of oxygen-based redox couples in this superoxide-based cathode.

Example 2

Figure 3:
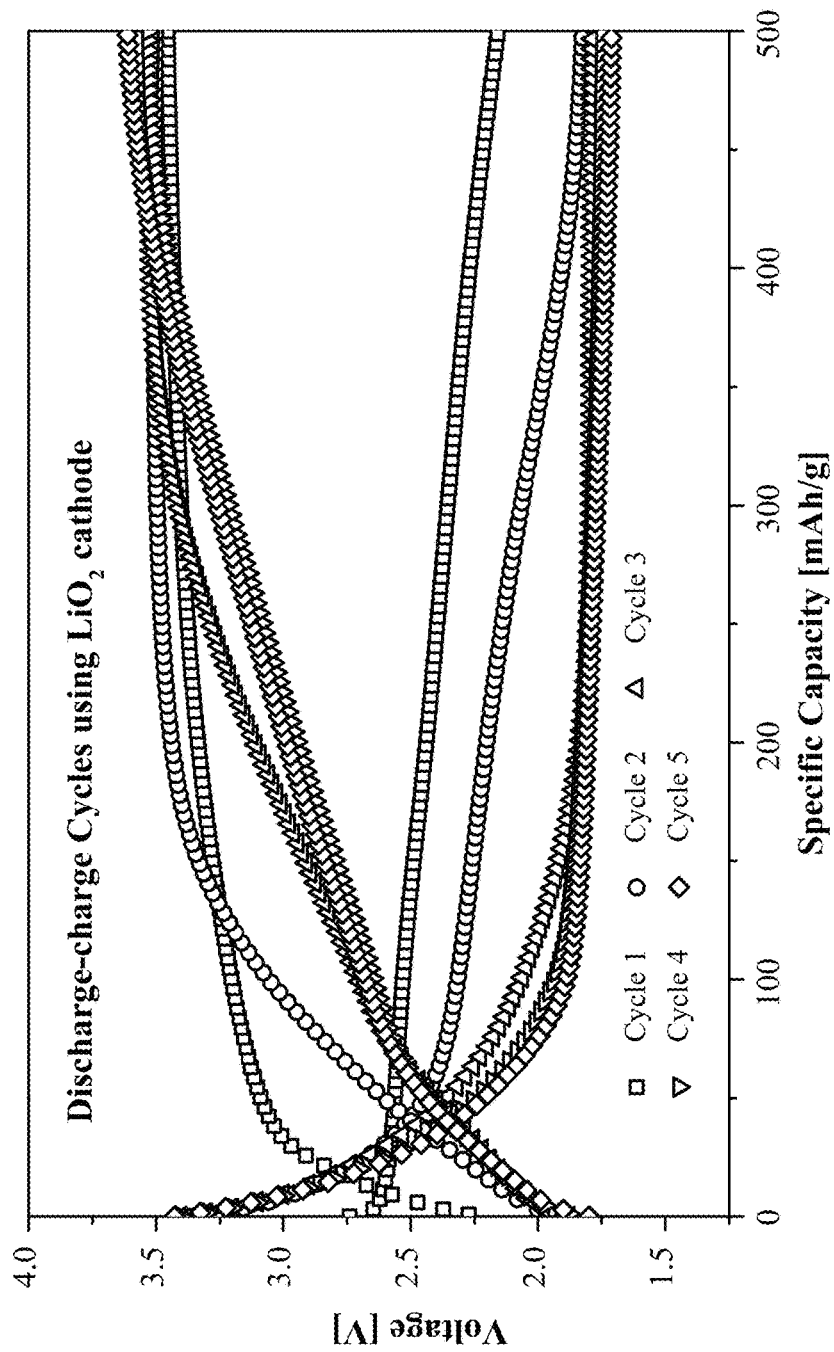
FIG. 3 depicts the cycling performance of a non-limiting example of a $LiO_2$ battery.
Figure 4:
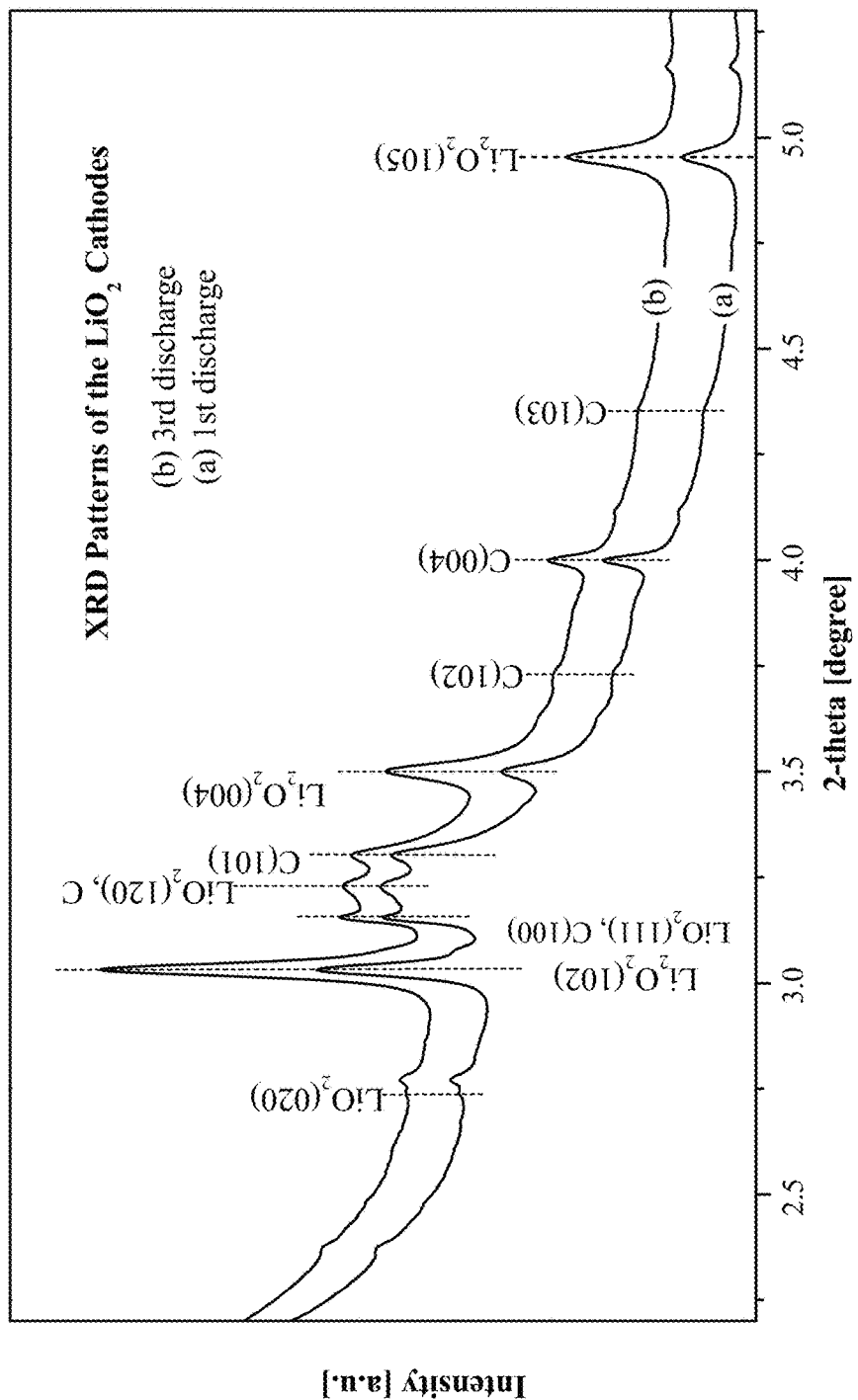
FIG. 4 depicts SEM images and X-ray diffraction (XRD) patterns of the $LiO_2$ electrodes stopped at different stages in the cycling described in FIG. 3.

A lithium ion cell was prepared using a $LiO_2$ cathode, obtained by a capacity-controlled discharge in a lithium air battery. The anode was lithium metal. The electrolyte was 1 M lithium trifluoromethanesulfonate ($LiCF_3SO_3$) in tetraethylene glycol dimethyl ether (TEGDME). The test current density was 100 mA/g, and the discharge-charge cycles were in a capacity-controlled mode with the specific capacity of 500 mAh/g and the voltage window between 1.5 and 3.7 V. FIG. 3 shows the cycling voltage profiles of this lithium ion battery using the $LiO_2$ cathode. The cycling redox reactions demonstrates the successful electrochemical reaction of oxygen-based redox couples in this lithium ion battery. FIG. 4 depicts XRD patterns of the $LiO_2$ electrodes stopped at different stages in the cycling described in FIG. 3, indicating the production of the discharge product ($Li_2O_2$) via the electrochemical reaction $LiO_2 + Li^+ + e^- \leftarrow \rightarrow Li_2O_2$.

Example 3

For cathodes with $Li_2O_2$ or mixed metal peroxide, cathode materials are uniformly mixed with metal peroxide particles and binder in N-methyl-2-pyrrolidone (NMP) solvent, and then coated on supporting layer to make a cathode.

Example 4

For electroactive carbon-coated material with superoxides or peroxides or oxides ($C/LO_2$ or $C/L_2O_2$ or $C/L_2O$; L=Li and Na), the cathode material is obtained by chemical vapor deposition (CVD), physical vapor deposition (PVD), atomic layer deposition (ALD), sputtering, or co-precipitation in non-aqueous media. The coated cathode materials are then uniformly mixed with a binder in N-methyl-2-pyrrolidone (NMP) solvent. The as-prepared slurry is then coated on a supporting layer to make a cathode.

Example 5

For electroactive metal-coated material with metal superoxides or metal peroxides ($X/LO_2$ or $X/L_2O_2$), the cathode material is obtained by chemical vapor deposition (CVD), physical vapor deposition (PVD), atomic layer deposition (ALD), sputtering, or co-precipitation in non-aqueous media. The coated cathode materials are then uniformly mixed with electroactive carbon and binder in N-methyl-2-pyrrolidone (NMP) solvent. The as-prepared slurry is then coated on a supporting layer to make a cathode.

Example 6

For nano-sized electroactive material with metal superoxides or metal peroxides, the cathode material is obtained by mechanical ball milling, ultrasonic treatment and co-precipitation in non-aqueous media. The nano-sized cathode material is then uniformly mixed with electroactive carbon and binder in N-methyl-2-pyrrolidone (NMP) solvent. The as-prepared slurry is then coated on a supporting layer to make a cathode.

Example 7

For doped electroactive material with metal superoxides or metal peroxides ($N_xL_{1-x}O_{2+y}$ or $N_xL_{2-x}O_{2+y}$), electroactive material is doped on metal superoxides or metal peroxides by thermal diffusion, ion implantation, chemical vaporous deposition, or atomic layer deposition. The doped cathode material is then uniformly mixed with electroactive carbon and binder in N-methyl-2-pyrrolidone (NMP) solvent. The as-prepared slurry is then coated on supporting layer to make a cathode.

Example 8

For lithium-metal-free cells, any of carbon nanotubes, carbon nanofibers, graphene, porous carbon, silicon and silicon monoxide, germanium, tin, and transition metal oxides, sulfides, phosphides and nitrides are employed as the anode materials, together with a $Li_2O_2$ cathode in a coin-cell configuration. Electrochemical reactions start from charging ($Li_2O_2 \rightarrow Li^+ + e^- + LiO_2$), with $Li^+$ ion intercalation into the anode materials. The overall electrochemical reaction is $LiO_2 + Li^+ + e^- \leftarrow \rightarrow Li_2O_2$ in this lithium-metal-free Li-ion battery system.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode comprising an electroactive material comprising $LO_2$ or $L_2O_2$, wherein each L is independently selected from Li, Na, K, Be, Mg, Ca, and Al; the electroactive material is metal-coated, metal oxide-coated, or doped; the electroactive material has less than or equal to 10 wt. % of transition metal catalyst; and the electroactive material is non-cycled active material, wherein the electroactive material is doped with Li, Na, K, Be, Mg, Ca, Al, Cu, Mn, Nd, Ag, Ti, Ni, Cd, Ir, Ta, Y, Zr, Nb, Rh, or Cr.

2. The cathode of claim 1, further comprising a current collector, a conductive carbon material, a binder, or any combination thereof.

3. An electrochemical device comprising the cathode of claim 1.

4. The electrochemical device of claim 3, wherein the electrochemical device is a lithium-ion battery.

5. The electrochemical device of claim 4, wherein the lithium-ion battery further comprises an anode and a separator.

6. The electrochemical device of claim 5, wherein the anode comprises a current collector, a conductive carbon material, a binder, or any combination thereof.

7. The electrochemical device of claim 5, wherein the anode is a metallic lithium anode.

8. The electrochemical device of claim 5, wherein the anode is substantially free of metallic lithium.

9. An electroactive material comprising $LO_2$ or $L_2O_2$, wherein each L is independently selected from Li, Na, K, Be, Mg, Ca, and Al; the electroactive material is metal-coated, metal oxide-coated, or doped; and the electroactive material is non-cycled active material, wherein the electroactive material is doped with a dopant selected from the group consisting of Li, Na, K, Be, Mg, Ca, Al, Cu, Mn, Nd, Ag, Ti, Ni, Cd, Ir, Ta, Y, Zr, Nb, Rh, and Cr.

10. The electroactive material of claim 9, wherein L is independently Li or K.

11. The electroactive material of claim 10, wherein L is Li.

12. The electroactive material of claim 9, wherein $LO_2$ or $L_2O_2$ is present in the electroactive material in an amount of from about 50 wt. % to about 100 wt. %.

13. The electroactive material of claim 9, wherein the dopant is present in the electroactive material in an amount of from about 1 wt. % to about 10 wt. %.

14. The electroactive material of claim 9, wherein the electroactive material comprises metal-coated particles of $LO_2$ or $L_2O_2$.

15. The electroactive material of claim 14, wherein the metal-coated particles are coated with a metal selected from the group consisting of aluminum, nickel, silver, gold, and platinum.

16. An electroactive material comprising $LO_2$ or $L_2O_2$, wherein each L is independently selected from Li, Na, K, Be, Mg, Ca, and Al; the electroactive material is metal-coated.

17. The electroactive material of claim 16, wherein the metal-coated particles are coated with a metal selected from the group consisting of aluminum, nickel, silver, gold, and platinum.

* * * * *